(12) United States Patent
Frick et al.

(10) Patent No.: US 8,540,568 B2
(45) Date of Patent: Sep. 24, 2013

(54) METHOD AND APPARATUS FOR JACKPOT PROGRESSION BASED ON MATHEMATICAL EXPECTANCY FOR WINS AT EACH PRICE POINT

(75) Inventors: Michael D. Frick, Crawfordville, FL (US); Mark B. Davis, San Juan, PR (US); David Richard Mizeur, Springfield, IL (US); Stan Pade, North Arlington, NJ (US)

(73) Assignee: Integrated Group Assets, Inc., Crawfordville, FL (US)

( * ) Notice: Subject to any disclaimer, the term of this patent is extended or adjusted under 35 U.S.C. 154(b) by 126 days.

(21) Appl. No.: 12/910,760

(22) Filed: Oct. 22, 2010

(65) Prior Publication Data

US 2012/0100904 A1 Apr. 26, 2012

(51) Int. Cl.
A63F 9/24 (2006.01)
A63F 13/00 (2006.01)

(52) U.S. Cl.
USPC .............................. 463/27; 463/17

(58) Field of Classification Search
USPC ............... 273/138.1, 269; 463/16–17, 27–28
See application file for complete search history.

(56) References Cited

U.S. PATENT DOCUMENTS

| | | | | |
|---|---|---|---|---|
| 5,909,875 A * | 6/1999 | Weingardt | | 273/269 |
| 6,017,032 A * | 1/2000 | Grippo et al. | | 273/138.1 |
| 2005/0176490 A1 * | 8/2005 | Wright | | 463/17 |
| 2005/0227759 A1 * | 10/2005 | Dolezal | | 463/28 |
| 2007/0184887 A1 * | 8/2007 | Cannon | | 463/16 |
| 2007/0235927 A1 * | 10/2007 | Wright | | 273/139 |
| 2007/0249418 A1 * | 10/2007 | Jubinville et al. | | 463/17 |
| 2007/0298875 A1 * | 12/2007 | Baerlocher et al. | | 463/27 |
| 2008/0064471 A1 * | 3/2008 | Bozeman | | 463/17 |
| 2008/0287185 A1 * | 11/2008 | Yoseloff et al. | | 463/27 |
| 2009/0036191 A1 * | 2/2009 | Hughes | | 463/17 |
| 2009/0088244 A1 * | 4/2009 | Nicely et al. | | 463/27 |
| 2009/0305777 A1 * | 12/2009 | Anderson | | 463/27 |
| 2010/0062824 A1 * | 3/2010 | Frick et al. | | 463/17 |
| 2010/0203958 A1 * | 8/2010 | Jackson | | 463/27 |

\* cited by examiner

Primary Examiner — Dmitry Suhol
Assistant Examiner — Jason Yen
(74) Attorney, Agent, or Firm — Patent Ingenuity, P.C.; Samuel K. Simpson

(57) ABSTRACT

A process provides a multi-priced lottery game with a first price point and a second price point such that (i) the first price point corresponds to a first known potential fixed prize and a first known potential percentage of a progressive prize and (ii) the second price point corresponds to a second known potential fixed prize and a second known potential percentage of the progressive prize. The second price point is greater than the first price point. The second known potential fixed prize is greater than the first known potential fixed prize. The second known potential percentage of the progressive prize is greater than the first known potential percentage of the progressive prize. Further, the process provides a portion of ticket sales for the multi-priced lottery game to a prize management fund.

26 Claims, 18 Drawing Sheets

Hypothetical Full-Year Illustration of Potential Jackpot Sequences

Hypothetical Distribution of Wagers: 70% @ $1, 20% @ $2 and 10% @ $5

Also Contributing for a Scenario in Which Sales Might Remain Flat Over Time (Notwithstanding Jackpot Increases):
If Sales Increase as Jackpots Grow, Then Total Top Jackpot Amounts Would Increase To Even Greater Levels Than Illustrated Below

| Jackpot No. | $5 Starting Jackpot | Expected Jackpot Accumulation from "Progressive" Allocation Alone | Jackpot Accumulation from Start of Excess Reserve | Total Jackpot Accumulation Above $5 Starting Jackpot Amount | Total Jackpot Amount for $5 Wager | Total Assets in Jackpot Mgr Acct. | Result | Amount Paid to Jackpot Winner | Total Assets Remaining | $5 Starting Jackpot Funding Reserve |
|---|---|---|---|---|---|---|---|---|---|---|
| 1 | $10,000,000 | $10,714,286 | $0 | $10,714,286 | $20,714,286 | $21,428,571 | $1 Winner | $2,071,429 / 10% | $19,357,143 | $19,357,143 |
| 2 | $10,000,000 | $20,714,286 | $8,916,409 | $29,630,695 | $39,630,695 | $40,788,714 | $1 Winner | $3,963,070 / 10% | $36,822,645 | $36,822,645 |
| 3 | $10,000,000 | $20,714,286 | $25,559,264 | $46,273,549 | $56,273,549 | $57,536,930 | $2 Winner | $14,068,387 / 25% | $43,468,543 | $43,468,543 |
| 4 | $10,000,000 | $20,714,286 | $32,572,774 | $53,287,059 | $63,287,059 | $64,937,115 | $1 Winner | $6,223,706 / 10% | $58,568,409 | $58,568,409 |
| 5 | $10,000,000 | $20,714,286 | $46,961,476 | $67,675,762 | $77,675,762 | $79,696,969 | $1 Winner | $7,767,670 / 10% | $72,229,410 | $72,229,410 |
| 6 | $10,000,000 | $20,714,286 | $59,979,867 | $80,693,252 | $90,693,252 | $93,657,981 | $1 Winner | $9,066,325 / 10% | $84,588,656 | $84,588,656 |
| 7 | $10,000,000 | $20,714,286 | $71,758,976 | $92,473,262 | $102,473,262 | $105,017,228 | $5 Winner | $102,478,392 / 100% | $3,546,865 | $3,546,865 |
| 8 | $10,000,000 | $14,642,857 | $238,649 | $14,881,507 | $24,881,507 | $24,979,457 | $1 Winner | $2,493,191 / 10% | $22,487,286 | $22,487,286 |
| 9 | $10,000,000 | $20,714,286 | $12,579,761 | $33,294,047 | $43,294,047 | $43,919,856 | $2 Winner | $4,323,493 / 25% | $39,996,463 | $39,996,463 |
| 10 | $10,000,000 | $20,714,286 | $28,873,535 | $49,587,821 | $59,587,821 | $61,018,024 | $1 Winner | $14,296,958 / 25% | $46,118,069 | $46,118,069 |
| 11 | $10,000,000 | $20,714,286 | $35,097,504 | $55,811,789 | $65,811,789 | $67,546,641 | $1 Winner | $6,981,179 / 10% | $60,865,462 | $60,865,462 |
| 12 | $10,000,000 | $20,714,286 | $49,285,565 | $69,999,851 | $79,999,851 | $82,334,333 | $1 Winner | $7,053,985 / 10% | $74,285,048 | $74,285,048 |

Figure 2

| Drawing | Winners S1 S2 S3 | Assets Before Drawing | | | Revenue (from Draw Handle) | | Amortization of Excess Cov Allocation to Progressive | Prize Payout Total |
|---|---|---|---|---|---|---|---|---|
| | | Progressive | Coverage Allocation | Total | to Coverage Allocation | to Progressive | | |
| 1 | 0 0 0 | 0 | 0 | 0 | 357,143 | 357,143 | 0 | 0 |
| 2 | 0 0 0 | 357,143 | 357,143 | 714,286 | 357,143 | 357,143 | 0 | 0 |
| 3 | 0 0 0 | 714,286 | 714,286 | 1,428,571 | 357,143 | 357,143 | 0 | 0 |
| 4 | 0 0 0 | 1,071,429 | 1,071,429 | 2,142,857 | 357,143 | 357,143 | 0 | 0 |
| 5 | 0 0 0 | 1,428,571 | 1,428,571 | 2,857,143 | 357,143 | 357,143 | 0 | 0 |
| 6 | 0 0 0 | 1,785,714 | 1,785,714 | 3,571,429 | 357,143 | 357,143 | 0 | 0 |
| 7 | 0 0 0 | 2,142,857 | 2,142,857 | 4,285,714 | 357,143 | 357,143 | 0 | 0 |
| 8 | 0 0 0 | 2,500,000 | 2,500,000 | 5,000,000 | 357,143 | 357,143 | 0 | 0 |
| 9 | 0 0 0 | 2,857,143 | 2,857,143 | 5,714,286 | 357,143 | 357,143 | 0 | 0 |
| 10 | 0 0 0 | 3,214,286 | 3,214,286 | 6,428,571 | 357,143 | 357,143 | 0 | 0 |
| 11 | 0 0 0 | 3,571,429 | 3,571,429 | 7,142,857 | 357,143 | 357,143 | 0 | 0 |
| 12 | 0 0 0 | 3,928,571 | 3,928,571 | 7,857,143 | 357,143 | 357,143 | 0 | 0 |
| 13 | 0 0 0 | 4,285,714 | 4,285,714 | 8,571,429 | 357,143 | 357,143 | 0 | 0 |
| 14 | 0 0 0 | 4,642,857 | 4,642,857 | 9,285,714 | 357,143 | 357,143 | 0 | 0 |
| 15 | 0 0 0 | 5,000,000 | 5,000,000 | 10,000,000 | 357,143 | 357,143 | 0 | 0 |

Figure 3A

| Drawing | Winners S1 S2 S3 | Assets Before Drawing Progressive | Coverage Allocation | Total | Revenues (from Draw Handle) Coverage Allocation | to Progressive | Amortization of Excess Cov Allocation to Progressive | Prize Payout Total |
|---|---|---|---|---|---|---|---|---|
| 16 | 0 0 0 | 5,357,143 | 5,357,143 | 10,714,286 | 357,143 | 357,143 | 0 | 0 |
| 17 | 0 0 0 | 5,714,286 | 5,714,286 | 11,428,571 | 357,143 | 357,143 | 0 | 0 |
| 18 | 0 0 0 | 6,071,429 | 6,071,429 | 12,142,857 | 357,143 | 357,143 | 0 | 0 |
| 19 | 0 0 0 | 6,428,571 | 6,428,571 | 12,857,143 | 357,143 | 357,143 | 0 | 0 |
| 20 | 0 0 0 | 6,785,714 | 6,785,714 | 13,571,429 | 357,143 | 357,143 | 0 | 0 |
| 21 | 0 0 0 | 7,142,857 | 7,142,857 | 14,285,714 | 357,143 | 357,143 | 0 | 0 |
| 22 | 0 0 0 | 7,500,000 | 7,500,000 | 15,000,000 | 357,143 | 357,143 | 0 | 0 |
| 23 | 0 0 0 | 7,857,143 | 7,857,143 | 15,714,286 | 357,143 | 357,143 | 0 | 0 |
| 24 | 0 0 0 | 8,214,286 | 8,214,286 | 16,428,571 | 357,143 | 357,143 | 0 | 0 |
| 25 | 0 0 0 | 8,571,429 | 8,571,429 | 17,142,857 | 357,143 | 357,143 | 0 | 0 |
| 26 | 0 0 0 | 8,928,571 | 8,928,571 | 17,857,143 | 357,143 | 357,143 | 0 | 0 |
| 27 | 0 0 0 | 9,285,714 | 9,285,714 | 18,571,429 | 357,143 | 357,143 | 0 | 0 |
| 28 | 0 0 0 | 9,642,857 | 9,642,857 | 19,285,714 | 0 | 714,286 | 0 | 0 |
| 29 | 0 0 0 | 10,000,000 | 10,000,000 | 20,000,000 | 0 | 714,286 | 0 | 0 |
| 30 | 0 0 0 | 10,714,286 | 10,000,000 | 20,714,286 | 357,143 | 714,286 | 0 | 2,071,429 |
| 31 | 0 0 0 | 0 | 19,357,143 | 19,357,143 | 0 | 0 | 935,714 | 0 |

Figure 3B

| Drawing | Winners S1 S2 S3 | Assets Before Drawing Progressive | Coverage Allocation | Total | Revenue (from Draw Handle) to Coverage Allocation | to Progressive | Amortization of Excess Cov Allocation to Progressive | Prize Payout Total |
|---|---|---|---|---|---|---|---|---|
| 32 | | 1,650,000 | 18,421,429 | 20,071,429 | 0 | 714,286 | 842,143 | 0 |
| 33 | | 3,206,429 | 17,579,286 | 20,785,714 | 0 | 714,286 | 757,929 | 0 |
| 34 | | 4,678,643 | 16,831,357 | 21,509,000 | 0 | 714,286 | 682,136 | 0 |
| 35 | | 6,075,084 | 16,139,221 | 22,214,286 | 0 | 714,286 | 613,922 | 0 |
| 36 | | 7,403,272 | 15,525,299 | 22,928,571 | 0 | 714,286 | 552,530 | 0 |
| 37 | | 8,670,088 | 14,972,769 | 23,642,857 | 0 | 714,286 | 497,277 | 0 |
| 38 | | 9,883,650 | 14,475,492 | 24,357,143 | 0 | 714,286 | 447,549 | 0 |
| 39 | | 11,048,485 | 14,027,943 | 25,071,429 | 0 | 714,286 | 402,794 | 0 |
| 40 | | 12,160,563 | 13,625,149 | 25,785,714 | 0 | 714,286 | 362,515 | 0 |
| 41 | | 13,237,366 | 13,262,634 | 26,500,000 | 0 | 714,286 | 326,263 | 0 |
| 42 | | 14,277,915 | 12,936,371 | 27,214,286 | 0 | 714,286 | 293,637 | 0 |
| 43 | | 15,285,838 | 12,642,734 | 27,928,571 | 0 | 714,286 | 264,273 | 0 |
| 44 | | 16,264,397 | 12,378,460 | 28,642,857 | 0 | 714,286 | 237,846 | 0 |
| 45 | | 17,216,529 | 12,140,614 | 29,357,143 | 0 | 714,286 | 214,061 | 0 |
| 46 | | 18,144,876 | 11,926,553 | 30,071,429 | 0 | 714,286 | 192,655 | 0 |

Figure 3C

| Drawing | Winners S1 S2 S3 | Assets Before Drawing | | | Revenue (from Draw Handle) to Coverage Allocation | Revenue (from Draw Handle) to Progressive | Amortization of Excess Cov Allocation to Progressive | Prize Payout Total |
|---|---|---|---|---|---|---|---|---|
| | | Progressive | Coverage Allocation | Total | | | | |
| 47 | | 19,051,817 | 11,733,897 | 30,785,714 | 0 | 714,286 | 173,380 | 0 |
| 48 | | 19,939,492 | 11,560,508 | 31,500,000 | 0 | 714,286 | 156,053 | 0 |
| 49 | | 20,809,829 | 11,404,457 | 32,214,286 | 0 | 714,286 | 140,446 | 0 |
| 50 | | 21,664,200 | 11,264,031 | 32,928,571 | 0 | 714,286 | 126,401 | 0 |
| 51 | | 22,505,247 | 11,137,630 | 33,642,857 | 0 | 714,286 | 113,763 | 0 |
| 52 | | 23,333,298 | 11,023,840 | 34,357,143 | 0 | 714,286 | 102,385 | 0 |
| 53 | | 24,149,464 | 10,921,464 | 35,071,429 | 0 | 714,286 | 92,146 | 0 |
| 54 | | 24,956,397 | 10,829,318 | 35,785,714 | 0 | 714,286 | 82,932 | 0 |
| 55 | | 25,753,614 | 10,746,386 | 36,500,000 | 0 | 714,286 | 74,639 | 0 |
| 56 | | 26,542,538 | 10,671,747 | 37,214,286 | 0 | 714,286 | 67,175 | 0 |
| 57 | | 27,323,999 | 10,604,573 | 37,928,571 | 0 | 714,286 | 60,457 | 0 |
| 58 | | 28,098,742 | 10,544,115 | 38,642,857 | 0 | 714,286 | 54,412 | 0 |
| 59 | | 28,867,439 | 10,489,704 | 39,357,143 | 0 | 714,286 | 48,970 | 0 |

Figure 3D

| Drawing | Winners | | | Assets Before Drawing | | | Revenue (from Draw Handle) | | Amortization of Excess Cov. Allocation to Progressive | Prize Payout Total |
|---|---|---|---|---|---|---|---|---|---|---|
| | $1 | $2 | $3 | Progressive | Coverage Allocation | Total | to Coverage Allocation | to Progressive | | |
| 60 | 0 | 0 | 0 | 29,630,695 | 10,440,733 | 40,071,429 | | | 44,073 | 1,962,070 |
| 61 | 1 | 0 | 0 | 0 | 36,822,445 | 36,822,445 | 0 | 714,286 | 3,082,564 | 0 |
| 62 | 0 | 0 | 0 | 3,196,550 | 34,140,380 | 37,336,930 | 0 | 714,286 | 2,414,058 | 0 |
| 63 | 0 | 0 | 0 | 6,624,874 | 31,726,342 | 38,351,216 | 0 | 714,286 | 2,172,634 | 0 |
| 64 | 0 | 0 | 0 | 9,611,794 | 29,353,708 | 38,965,502 | 0 | 714,286 | 1,955,571 | 0 |
| 65 | 0 | 0 | 0 | 12,081,450 | 27,598,337 | 39,679,788 | 0 | 714,286 | 1,759,834 | 0 |
| 66 | 0 | 0 | 0 | 14,555,570 | 25,838,504 | 40,394,073 | 0 | 714,286 | 1,583,850 | 0 |
| 67 | 0 | 0 | 0 | 16,853,766 | 24,254,653 | 41,108,359 | 0 | 714,286 | 1,425,465 | 0 |
| 68 | 0 | 0 | 0 | 18,993,457 | 22,829,188 | 41,822,645 | 0 | 714,286 | 1,282,919 | 0 |
| 69 | 0 | 0 | 0 | 20,990,663 | 21,346,269 | 42,336,930 | 0 | 714,286 | 1,154,627 | 0 |
| 70 | 0 | 0 | 0 | 22,859,574 | 20,391,642 | 43,251,216 | 0 | 714,286 | 1,039,164 | 0 |
| 71 | 0 | 0 | 0 | 24,613,024 | 19,352,478 | 43,965,502 | 0 | 714,286 | 935,248 | 0 |
| 72 | 0 | 0 | 0 | 26,262,457 | 18,417,230 | 44,679,788 | 0 | 714,286 | 841,723 | 0 |
| 73 | 0 | 0 | 0 | 27,818,566 | 17,575,507 | 45,394,073 | 0 | 714,286 | 757,551 | 0 |
| 74 | 0 | 0 | 0 | 29,290,403 | 16,817,956 | 46,108,359 | 0 | 714,286 | 681,796 | 0 |

Figure 3E

| Drawing | Winners | | | Assets Before Drawing | | | Revenue from Draw Handle | | Amortization of Excess | Prize Payout |
| | $1 | $2 | $3 | Progressive | Coverage Allocation | Total | to Coverage Allocation | to Progressive | Cov. Allocation to Progressive | Total |
| --- | --- | --- | --- | --- | --- | --- | --- | --- | --- | --- |
| 75 | 0 | 0 | 0 | 30,686,484 | 16,136,161 | 46,822,645 | 0 | 714,286 | 613,616 | 0 |
| 76 | 0 | 0 | 0 | 32,014,388 | 15,522,543 | 47,536,930 | 0 | 714,286 | 552,254 | 0 |
| 77 | 0 | 0 | 0 | 33,280,926 | 14,970,290 | 48,251,216 | 0 | 714,286 | 497,029 | 0 |
| 78 | 0 | 0 | 0 | 34,492,241 | 14,473,261 | 48,965,502 | 0 | 714,286 | 447,326 | 0 |
| 79 | 0 | 0 | 0 | 35,653,853 | 14,024,935 | 49,679,788 | 0 | 714,286 | 402,594 | 0 |
| 80 | 0 | 0 | 0 | 36,770,732 | 13,623,342 | 50,394,073 | 0 | 714,286 | 362,334 | 0 |
| 81 | 0 | 0 | 0 | 37,847,352 | 13,261,007 | 51,108,359 | 0 | 714,286 | 326,101 | 0 |
| 82 | 0 | 0 | 0 | 38,887,738 | 12,934,907 | 51,822,645 | 0 | 714,286 | 293,491 | 0 |
| 83 | 0 | 0 | 0 | 39,895,514 | 12,641,416 | 52,536,930 | 0 | 714,286 | 264,142 | 0 |
| 84 | 0 | 0 | 0 | 40,873,942 | 12,377,274 | 53,251,216 | 0 | 714,286 | 237,727 | 0 |
| 85 | 0 | 0 | 0 | 41,825,955 | 12,139,547 | 53,965,502 | 0 | 714,286 | 213,955 | 0 |
| 86 | 0 | 0 | 0 | 42,754,395 | 11,924,392 | 54,678,788 | 0 | 714,286 | 192,559 | 0 |
| 87 | 0 | 0 | 0 | 43,661,040 | 11,733,033 | 55,394,073 | 0 | 714,286 | 173,303 | 0 |
| 88 | 0 | 0 | 0 | 44,548,629 | 11,559,730 | 56,108,359 | 0 | 714,286 | 155,973 | 0 |
| 89 | 0 | 0 | 0 | 45,418,888 | 11,403,757 | 56,822,645 | 0 | 714,286 | 140,376 | 0 |
| 90 | 0 | 1 | 0 | 46,273,549 | 11,263,381 | 57,536,930 | 0 | 714,286 | 126,338 | 14,068,387 |

Figure 3F

| Drawing | Winners | | | Assets Before Drawing | | | Revenue (from Draw Handles) | | Amortization of Excess Cov Allocation to Progressive | Prize Payout Total |
| | S1 | S2 | S3 | Progressive | Coverage Allocation | Total | to Coverage Allocation | to Progressive | | |
|---|---|---|---|---|---|---|---|---|---|---|
| 91 | 0 | 0 | 0 | 0 | 44,182,829 | 44,182,829 | 0 | 714,286 | 3,418,283 | 0 |
| 92 | 0 | 0 | 0 | 4,132,569 | 40,764,546 | 44,897,115 | 0 | 714,286 | 3,076,455 | 0 |
| 93 | 0 | 0 | 0 | 7,923,309 | 37,688,091 | 45,611,400 | 0 | 714,286 | 2,768,809 | 0 |
| 94 | 0 | 0 | 0 | 11,406,404 | 34,919,282 | 46,325,686 | 0 | 714,286 | 2,493,828 | 0 |
| 95 | 0 | 0 | 0 | 14,612,618 | 32,427,354 | 47,039,972 | 0 | 714,286 | 2,242,735 | 0 |
| 96 | 0 | 0 | 0 | 17,569,639 | 30,184,619 | 47,754,257 | 0 | 714,286 | 2,018,462 | 0 |
| 97 | 0 | 0 | 0 | 20,302,386 | 28,166,157 | 48,468,543 | 0 | 714,286 | 1,816,616 | 0 |
| 98 | 0 | 0 | 0 | 22,833,288 | 26,349,541 | 49,182,829 | 0 | 714,286 | 1,634,954 | 0 |
| 99 | 0 | 0 | 0 | 25,182,528 | 24,714,587 | 49,897,115 | 0 | 714,286 | 1,471,459 | 0 |
| 100 | 0 | 0 | 0 | 27,366,272 | 23,245,128 | 50,611,400 | 0 | 714,286 | 1,324,313 | 0 |
| 101 | 0 | 0 | 0 | 29,408,871 | 21,918,815 | 51,325,686 | 0 | 714,286 | 1,191,882 | 0 |
| 102 | 0 | 0 | 0 | 31,313,038 | 20,726,934 | 52,039,972 | 0 | 714,286 | 1,072,693 | 0 |
| 103 | 0 | 0 | 0 | 33,100,017 | 19,654,240 | 52,754,257 | 0 | 714,286 | 965,424 | 0 |
| 104 | 0 | 0 | 0 | 34,779,727 | 18,688,816 | 53,468,543 | 0 | 714,286 | 868,882 | 0 |
| 105 | 0 | 0 | 0 | 36,362,894 | 17,819,935 | 54,182,829 | 0 | 714,286 | 781,993 | 0 |

| Drawing | Winners S1 S2 S3 | Assets Before Drawing Progressive | Assets Before Drawing Coverage Allocation | Assets Before Drawing Total | Revenue (from Draw Handle) to Coverage Allocation | Revenue (from Draw Handle) to Progressive | Amortization of Excess Cov Allocation to Progressive | Prize Payout Total |
|---|---|---|---|---|---|---|---|---|
| 121 | 0 0 0 | 0 | 59,282,664 | 59,282,664 | 0 | 714,286 | 4,938,269 | 0 |
| 122 | 0 0 0 | 5,642,555 | 54,354,425 | 59,996,980 | 0 | 714,286 | 4,435,442 | 0 |
| 123 | 0 0 0 | 10,792,283 | 49,918,982 | 60,711,266 | 0 | 714,286 | 3,991,898 | 0 |
| 124 | 0 0 0 | 15,498,467 | 45,927,084 | 61,425,551 | 0 | 714,286 | 3,592,708 | 0 |
| 125 | 0 0 0 | 19,805,461 | 42,334,376 | 62,139,837 | 0 | 714,286 | 3,233,438 | 0 |
| 126 | 0 0 0 | 23,753,185 | 39,100,938 | 62,854,123 | 0 | 714,286 | 2,910,094 | 0 |
| 127 | 0 0 0 | 27,377,564 | 36,190,844 | 63,568,409 | 0 | 714,286 | 2,619,084 | 0 |
| 128 | 0 0 0 | 30,710,924 | 33,571,760 | 64,282,694 | 0 | 714,286 | 2,357,175 | 0 |
| 129 | 0 0 0 | 33,782,396 | 31,214,584 | 64,996,980 | 0 | 714,286 | 2,121,458 | 0 |
| 130 | 0 0 0 | 36,618,140 | 29,093,126 | 65,711,266 | 0 | 714,286 | 1,909,313 | 0 |
| 131 | 0 0 0 | 39,241,739 | 27,183,813 | 66,425,551 | 0 | 714,286 | 1,718,381 | 0 |
| 132 | 0 0 0 | 41,674,406 | 25,465,432 | 67,139,837 | 0 | 714,286 | 1,546,543 | 0 |
| 133 | 0 0 0 | 43,935,234 | 23,918,889 | 67,854,123 | 0 | 714,286 | 1,391,889 | 0 |
| 134 | 0 0 0 | 46,041,409 | 22,527,089 | 68,568,409 | 0 | 714,286 | 1,252,700 | 0 |
| 135 | 0 0 0 | 48,008,395 | 21,274,388 | 69,282,694 | 0 | 714,286 | 1,127,430 | 0 |

Figure 31

| Drawing | Winners | | | Assets Before Drawing | | | Revenue (from Draw Handle) | | Amortization of Excess Cov Allocation to Progressive | Prize Payout Total |
|---|---|---|---|---|---|---|---|---|---|---|
| | S3 | S2 | SS | Progressive | Coverage Allocation | Total | to Coverage Allocation | to Progressive | | |
| 136 | 0 | 0 | 0 | 49,850,110 | 20,146,870 | 68,996,980 | 0 | 714,286 | 3,814,887 | 0 |
| 137 | 0 | 0 | 0 | 51,579,083 | 19,132,183 | 70,711,266 | 0 | 714,286 | 913,218 | 0 |
| 138 | 0 | 0 | 0 | 53,206,587 | 18,218,964 | 71,425,551 | 0 | 714,286 | 823,596 | 0 |
| 139 | 0 | 0 | 0 | 54,742,769 | 17,397,068 | 72,139,837 | 0 | 714,286 | 739,707 | 0 |
| 140 | 0 | 0 | 0 | 56,196,762 | 16,657,361 | 72,854,123 | 0 | 714,286 | 665,738 | 0 |
| 141 | 0 | 0 | 0 | 57,576,784 | 15,991,623 | 73,568,409 | 0 | 714,286 | 599,163 | 0 |
| 142 | 0 | 0 | 0 | 58,890,232 | 15,392,463 | 74,282,694 | 0 | 714,286 | 539,246 | 0 |
| 143 | 0 | 0 | 0 | 60,143,764 | 14,853,216 | 74,996,980 | 0 | 714,286 | 485,322 | 0 |
| 144 | 0 | 0 | 0 | 61,343,371 | 14,367,895 | 75,711,266 | 0 | 714,286 | 436,789 | 0 |
| 145 | 0 | 0 | 0 | 62,494,446 | 13,931,105 | 76,425,551 | 0 | 714,286 | 393,111 | 0 |
| 146 | 0 | 0 | 0 | 63,601,842 | 13,537,995 | 77,139,837 | 0 | 714,286 | 353,799 | 0 |
| 147 | 0 | 0 | 0 | 64,669,928 | 13,184,195 | 77,854,123 | 0 | 714,286 | 318,420 | 0 |
| 148 | 0 | 0 | 0 | 65,702,633 | 12,865,776 | 78,568,409 | 0 | 714,286 | 286,578 | 0 |
| 149 | 0 | 0 | 0 | 66,703,496 | 12,579,198 | 79,282,694 | 0 | 714,286 | 257,920 | 0 |
| 150 | 0 | 0 | 1 | 67,675,702 | 12,321,278 | 79,996,980 | 0 | 714,286 | 232,128 | 7,767,570 |
| 151 | 0 | 0 | 0 | 0 | 72,943,696 | 72,943,696 | 0 | 714,286 | (7,944,371) | 0 |

| Drawing | Winners | | | Assets Before Drawing | | | Revenue from Draw Handle | | Amortization of Excess Cov Allocation to Progressive | Prize Payout Total |
|---|---|---|---|---|---|---|---|---|---|---|
| | S1 | S2 | S5 | Progressive | Coverage Allocation | Total | to Coverage Allocation | to Progressive | | |
| 167 | 0 | 0 | 0 | 62,708,673 | 21,663,594 | 84,372,267 | 0 | 714,286 | 1,166,359 | 0 |
| 168 | 0 | 0 | 0 | 64,589,318 | 20,497,234 | 85,086,553 | 0 | 714,286 | 1,049,723 | 0 |
| 169 | 0 | 0 | 0 | 66,353,327 | 19,447,511 | 85,800,838 | 0 | 714,286 | 944,751 | 0 |
| 170 | 0 | 0 | 0 | 68,012,364 | 18,502,760 | 86,515,124 | 0 | 714,286 | 850,276 | 0 |
| 171 | 0 | 0 | 0 | 69,576,926 | 17,652,484 | 87,229,410 | 0 | 714,286 | 765,248 | 0 |
| 172 | 0 | 0 | 0 | 71,056,460 | 16,887,236 | 87,943,696 | 0 | 714,286 | 688,724 | 0 |
| 173 | 0 | 0 | 0 | 72,459,469 | 16,198,512 | 88,657,981 | 0 | 714,286 | 619,851 | 0 |
| 174 | 0 | 0 | 0 | 73,793,606 | 15,578,661 | 89,372,267 | 0 | 714,286 | 557,866 | 0 |
| 175 | 0 | 0 | 0 | 75,065,758 | 15,020,795 | 90,086,553 | 0 | 714,286 | 502,079 | 0 |
| 176 | 0 | 0 | 0 | 76,282,123 | 14,518,715 | 90,800,838 | 0 | 714,286 | 451,872 | 0 |
| 177 | 0 | 0 | 0 | 77,448,280 | 14,066,859 | 91,515,124 | 0 | 714,286 | 406,684 | 0 |
| 178 | 0 | 0 | 0 | 78,569,251 | 13,660,159 | 92,229,410 | 0 | 714,286 | 366,016 | 0 |
| 179 | 0 | 0 | 0 | 79,649,552 | 13,294,143 | 92,943,696 | 0 | 714,286 | 329,414 | 0 |
| 180 | 0 | 0 | 1 | 80,693,252 | 12,964,729 | 93,657,981 | 0 | 714,286 | 296,473 | 9,069,325 |
| 181 | 0 | 0 | 0 | 0 | 85,302,942 | 85,302,942 | 0 | 714,286 | 7,592,204 | 0 |

Figure 3L

METHOD AND APPARATUS FOR JACKPOT PROGRESSION BASED ON MATHEMATICAL EXPECTANCY FOR WINS AT EACH PRICE POINT

BACKGROUND

1. Field

This disclosure generally relates to the field of gaming. More particularly, the disclosure relates to a game of chance.

2. General Background

A lottery game may include a fixed prize allocation and a progressive prize allocation. The fixed prize allocation is a constant quantity that a player knows that he or she will win if he or she has a winning number. For example, a player may know that he or she will win a prize of one hundred thousand dollars if he or she has a winning number. In addition, the player may win a progressive prize that varies. As an example, the player who has a winning number may win a fixed prize of one hundred thousand dollars in addition to a progressive prize of fifty thousand dollars in a given week. In a different week, that player may still win the fixed prize of one hundred thousand dollars, but the additional progressive prize may be only twenty thousand dollars.

Further, a lottery game may be a multiple priced lottery game. In other words, the lottery game may have a plurality of difference prices corresponding to potential prize winnings in the game. As an example, a lottery game may have three price points: a one dollar game entry, a two dollar game entry, and a three dollar game entry. Each price point has a corresponding potential fixed prize that may be won. For example, a player purchasing the one dollar game entry may win a fixed prize of one hundred thousand dollars, a player purchasing the two dollar game entry may win a fixed prize of two hundred fifty thousand dollars, and a player purchasing the three dollar game entry may win a fixed prize of one million dollars. Further, different potential portions of the progressive prize may be allotted to winners based on the price point of the tickets they purchased. As an example, the portion of the progressive prize may be the same proportion as the fixed prize when compared with the maximum fixed prize. For instance, a one dollar player has the opportunity to win a potential fixed prize of one hundred thousand dollars, which equals ten percent of the maximum fixed prize of one million dollars. Accordingly, the one dollar player may win ten percent of the progressive prize at a given time. For example, if the progressive prize in a given week is twenty thousand dollars, the player may win two thousand dollars in addition to the fixed prize of one hundred thousand dollars. The two thousand dollars is subtracted from the twenty thousand dollars to leave a remaining progressive prize of eighteen thousand dollars. However, if a three dollar player won, that player would receive the entire progressive prize of twenty thousand dollars in addition to the fixed prize of one million dollars. As a result, the progressive prize would be reset to zero.

In a multiple priced lottery game, the majority of lottery tickets are typically sold at the lower price points. Accordingly, the progressive prize typically does not reset to zero in a multiple priced lottery game. The progressive prize typically fluctuates as it goes up until a typical lower priced point player wins, moves down a relatively small amount to reflect that lower priced point win, moves up until there is another winner, etc.

A large portion of lottery games typically involve casual players. The casual player of the multiple priced lottery game will typically not see the progressive prize be reset to zero. On the contrary, the casual player observing the progressive prize once in a while will mostly likely view the progressive prize as having small variations. As a result, a large number of players may have the perception that the particular multiple priced lottery game does not have any winners. Accordingly, less players purchase the multiple priced lottery game with the progressive component.

SUMMARY

In one aspect of the disclosure, a process is provided. The process provides a multi-priced lottery game with a first price point and a second price point such that (i) the first price point corresponds to a first known potential fixed prize and a first known potential percentage of a progressive prize and (ii) the second price point corresponds to a second known potential fixed prize and a second known potential percentage of the progressive prize. The second price point is greater than the first price point. The second known potential fixed prize is greater than the first known potential fixed prize. The second known potential percentage of the progressive prize is greater than the first known potential percentage of the progressive prize. Further, the process provides a portion of ticket sales for the multi-priced lottery game to a prize management fund. In addition, the process provides an amount of the prize management fund to a coverage allocation for the second known potential fixed prize. The process also provides an amount of the prize management fund to a progressive prize allocation for the progressive prize. Further, the process provides an additional amount of the prize management fund to the progressive prize allocation for the progressive prize to accelerate growth of the progressive prize if a coverage threshold for the coverage allocation has been surpassed. In addition, the process randomly generates, with a random generation apparatus, a winning set of indicia. The process also provides the first known potential fixed prize and the first known potential percentage of the progressive prize to a player if the player purchased a lottery ticket at the first price point with indicia that at least partially match the winning set of indicia. Further, the process provides the second known potential fixed prize and the second known potential percentage of the progressive prize to a player if the player purchased a lottery ticket at the second price point with indicia that at least partially match the winning set of indicia. In addition, the process resets the progressive prize to a predetermined reset value after a player wins a fixed prize irrespective of price point.

In another aspect of the disclosure, a process is provided. The process provides a multi-priced lottery game with a first price point and a second price point such that (i) the first price point corresponds to a first pari-mutuel prize and a first known potential percentage of a progressive prize and (ii) the second price point corresponds to a second pari-mutuel prize and a second known potential percentage of the progressive prize. The second price point is greater than the first price point. The second pari-mutuel prize is greater than the first pari-mutuel prize, the second known potential percentage of the progressive prize being greater than the first known potential percentage of the progressive prize. Further, the process provides a portion of ticket sales for the multi-priced lottery game to a prize management fund. In addition, the process provides an amount of the prize management fund to a coverage allocation for the second pari-mutuel prize. The process also provides an amount of the prize management fund to a progressive prize allocation for the progressive prize. Further, the process provides an additional amount of the prize management fund to the progressive prize allocation for the progressive prize to accelerate growth of the progressive prize if a coverage threshold for the coverage allocation has been surpassed. The process also randomly generates, with a random generation apparatus, a winning set of indicia. Further, the process provides the first pari-mutuel prize and the first known potential percentage of the progressive prize to a player if the player purchased a lottery ticket at the first price point with indicia that at least partially match the winning set of indicia. In addition, the process provides the second pari-mutuel prize and the second known potential percentage of the progressive prize to a player if the player purchased a lottery ticket at the second price point with indicia that at least partially match the winning set of indicia. The process also resets the progressive prize to a predetermined reset value after a player wins a pari-mutuel prize irrespective of price point.

In another aspect of the disclosure, a computer program product is provided. The computer program product includes a computer useable medium having a computer readable program. The computer readable program when executed on a computer causes the computer to provide a multi-priced lottery game with a first price point and a second price point such that (i) the first price point corresponds to a first known potential fixed prize and a first known potential percentage of a progressive prize and (ii) the second price point corresponds to a second known potential fixed prize and a second known potential percentage of the progressive prize. The second price point is greater than the first price point. The second known potential fixed prize is greater than the first known potential fixed prize. The second known potential percentage of the progressive prize is greater than the first known potential percentage of the progressive prize. Further, the computer readable program when executed on the computer causes the computer to provide a portion of ticket sales for the multi-priced lottery game to a prize management fund. In addition, the computer readable program when executed on the computer causes the computer to provide an amount of the prize management fund to a coverage allocation for the second known potential fixed prize. The computer readable program when executed on the computer causes the computer to provide an amount of the prize management fund to a progressive prize allocation for the progressive prize. Further, the computer readable program when executed on the computer causes the computer to provide an additional amount of the prize management fund to the progressive prize allocation for the progressive prize to accelerate growth of the progressive prize if a coverage threshold for the coverage allocation has been surpassed. In addition, the computer readable program when executed on the computer causes the computer to randomly generate, with a random generation apparatus, a winning set of indicia. The computer readable program when executed on the computer causes the computer to provide the first known potential fixed prize and the first known potential percentage of the progressive prize to a player if the player purchased a lottery ticket at the first price point with indicia that at least partially match the winning set of indicia. Further, the computer readable program when executed on the computer causes the computer to provide the second known potential fixed prize and the second known potential percentage of the progressive prize to a player if the player purchased a lottery ticket at the second price point with indicia that at least partially match the winning set of indicia. In addition, the computer readable program when executed on the computer causes the computer to reset the progressive prize to a predetermined reset value after a player wins a fixed prize irrespective of price point.

In yet another aspect of the disclosure, a computer program product is provided. The computer program product includes a computer useable medium having a computer readable program. The computer readable program when executed on a computer causes the computer to provide a multi-priced lottery game with a first price point and a second price point such that (i) the first price point corresponds to a first pari-mutuel prize and a first known potential percentage of a progressive prize and (ii) the second price point corresponds to a second pari-mutuel prize and a second known potential percentage of the progressive prize, the second price point being greater than the first price point, the second pari-mutuel prize being greater than the first pari-mutuel prize, the second known potential percentage of the progressive prize being greater than the first known potential percentage of the progressive prize. Further, the computer readable program when executed on the computer causes the computer to provide a portion of ticket sales for the multi-priced lottery game to a prize management fund. In addition, the computer readable program when executed on the computer causes the computer to provide an amount of the prize management fund to a coverage allocation for the second pari-mutuel prize. The computer readable program when executed on the computer causes the computer to provide an amount of the prize management fund to a progressive prize allocation for the progressive prize. Further, the computer readable program when executed on the computer causes the computer to provide an additional amount of the prize management fund to the progressive prize allocation for the progressive prize to accelerate growth of the progressive prize if a coverage threshold for the coverage allocation has been surpassed. In addition, the computer readable program when executed on the computer causes the computer to randomly generate, with a random generation apparatus, a winning set of indicia. The computer readable program when executed on the computer also causes the computer to provide the first pari-mutuel prize and the first known potential percentage of the progressive prize to a player if the player purchased a lottery ticket at the first price point with indicia that at least partially match the winning set of indicia. Further, the computer readable program when executed on the computer causes the computer to provide the second pari-mutuel prize and the second known potential percentage of the progressive prize to a player if the player purchased a lottery ticket at the second price point with indicia that at least partially match the winning set of indicia. In addition, the computer readable program when executed on the computer causes the computer to reset the progressive prize to a predetermined reset value after a player wins a pari-mutuel prize irrespective of price point.

In yet another aspect of the disclosure, a system is provided. The system includes an establishment module that establishes a multi-priced lottery game with a first price point and a second price point such that (i) the first price point corresponds to a first known potential fixed prize and a first known potential percentage of a progressive prize and (ii) the second price point corresponds to a second known potential fixed prize and a second known potential percentage of the progressive prize The second price point is greater than the first price point. The second known potential fixed prize is greater than the first known potential fixed prize. The second known potential percentage of the progressive prize is greater than the first known potential percentage of the progressive prize. Further, the system includes an allocation module, which is operated by a processor, that (i) provides a portion of ticket sales for the multi-priced lottery game to a prize management fund, (ii) provides an amount of the prize management fund to a coverage allocation for the second known potential fixed prize, (iii) provides an amount of the prize management fund to a progressive prize allocation for the progressive prize, and (iv) provides an additional amount of the prize management fund to the progressive prize allocation for the progressive prize to accelerate growth of the progressive prize if a coverage threshold for the coverage allocation has been surpassed. In addition, the system includes a random generation apparatus that randomly generates a winning set of indicia. The system also includes a first distribution module that provides the first known potential fixed prize and the first known potential percentage of the progressive prize to a player if the player purchased a lottery ticket at the first price point with indicia that at least partially match the winning set of indicia. Further, the system includes a second distribution module that provides the second known potential fixed prize and the second known potential percentage of the progressive prize to a player if the player purchased a lottery ticket at the second price point with indicia that at least partially match the winning set of indicia. In addition, the system includes a reset module that resets the progressive prize to a predetermined reset value after a player wins a fixed prize irrespective of price point.

In another aspect of the disclosure, a system is provided. The system includes an establishment module that establishes a multi-priced lottery game with a first price point and a second price point such that (i) the first price point corresponds to a first pari-mutuel prize and a first known potential percentage of a progressive prize and (ii) the second price point corresponds to a second pari-mutuel prize and a second known potential percentage of the progressive prize. The second price point is greater than the first price point, the second pari-mutuel prize being greater than the first pari-mutuel prize. The second known potential percentage of the progressive prize is greater than the first known potential percentage of the progressive prize. Further, the system includes an allocation module, which is operated by a processor, that (i) provides a portion of ticket sales for the multi-priced lottery game to a prize management fund, (ii) provides an amount of the prize management fund to a coverage allocation for the second pari-mutuel prize, and (iii) provides an amount of the prize management fund to a progressive prize allocation for the progressive prize, and (iv) provides an additional amount of the prize management fund to the progressive prize allocation for the progressive prize to accelerate growth of the progressive prize if a coverage threshold for the coverage allocation has been surpassed. The system also includes a random generation apparatus that randomly generates a winning set of indicia. Further, the system includes a first distribution module that provides the first pari-mutuel prize and the first known potential percentage of the progressive prize to a player if the player purchased a lottery ticket at the first price point with indicia that at least partially match the winning set of indicia. In addition, the system includes a second distribution module that provides the second pari-mutuel prize and the second known potential percentage of the progressive prize to a player if the player purchased a lottery ticket at the second price point with indicia that at least partially match the winning set of indicia. The system also includes a reset module that resets the progressive prize to a predetermined reset value after a player wins a pari-mutuel prize irrespective of price point.

BRIEF DESCRIPTION OF THE DRAWINGS

The above-mentioned features of the present disclosure will become more apparent with reference to the following description taken in conjunction with the accompanying drawings wherein like reference numerals denote like elements and in which:

FIG. 2 illustrates an example of a plurality of distributions of prizes according to the prize structure illustrated in FIG. 1.

FIGS. 3A though 3L illustrates a plurality of drawings in which the progressive prize is accelerated.

DETAILED DESCRIPTION

A method, apparatus, and computer program product are provided to assist an entity such as a lottery, lottery operator, lottery vendor, gaming establishment, etc. manage the progressive feature of a multi-priced lottery game. Increments from draw to draw are determined so that the gaming entity can both accelerate growth of the progressive prize in addition to providing self coverage for large fixed or pari-mutuel prizes.

Figure 1:
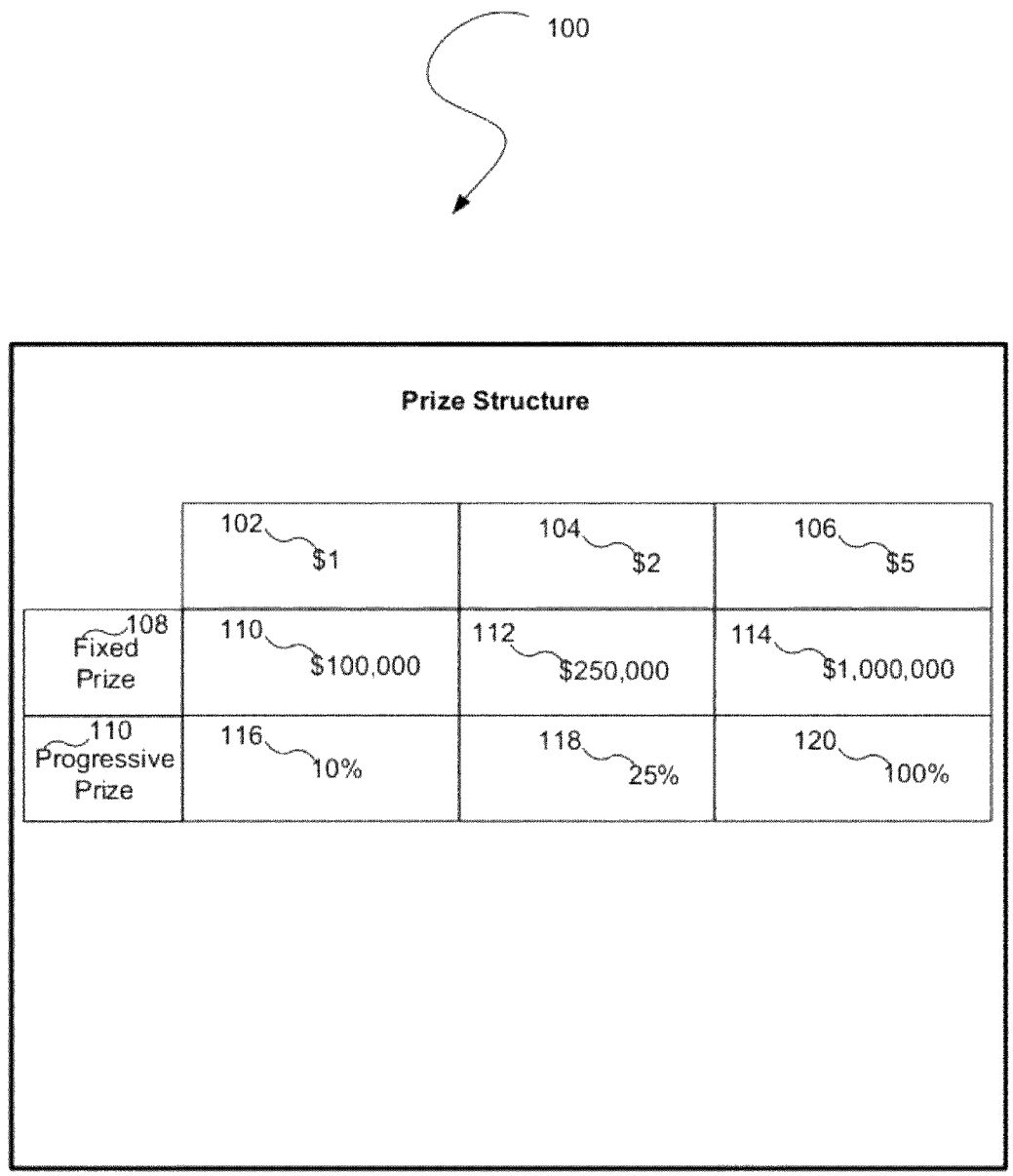
FIG. 1 illustrates a prize structure for a multi-priced lottery game. The prize structure has a plurality of price points.

FIG. 1 illustrates a prize structure 100 for a multi-priced lottery game. The prize structure 100 has a plurality of price points. As an example, the prize structure 100 may have a first price point 102 for one dollar, a second price point 104 for two dollars, and a third price point 106 for five dollars. With respect to each price point, a player with a winning lottery number may win a corresponding potential fixed prize 108. For example, a player that purchases a one dollar price point 102 may win a first fixed prize 110 of one hundred thousand dollars, a player that purchases a two dollar price point 104 may win a second fixed prize 112 of two hundred fifty thousand dollars, and a player that purchases a three dollar price point 106 may wing a third fixed prize 114 of one million dollars. In one embodiment, the progressive prize 110 equals a percentage of the fixed prize 108. In one configuration, the percentage equals the percentage of the fixed prize for a given price of the maximum fixed prize for the maximum price point. For example, a first price point progressive percentage 116 may equal ten percent since the first fixed prize 110 of one hundred thousand dollars is ten percent of the third fixed prize 114 of one million dollars. As another example, a second price point progressive percentage 118 may equal twenty five percent since the second fixed prize 112 is twenty five percent of the third fixed prize 114. As yet another example, a third price point progressive percentage 120 is one hundred percent sine the third fixed prize 114 is one hundred percent of the third fixed prize 114.

FIG. 2 illustrates an example of a plurality of distributions of prizes according to the prize structure 100 illustrated in FIG. 1. This hypothetical distribution over the span of twelve jackpot winners illustrates seventy percent of the winners being lottery players who purchased the one dollar price point, twenty percent of the players who purchased the two dollar price point, and ten percent of the players who purchase the five dollar price point.

Figure 3H:
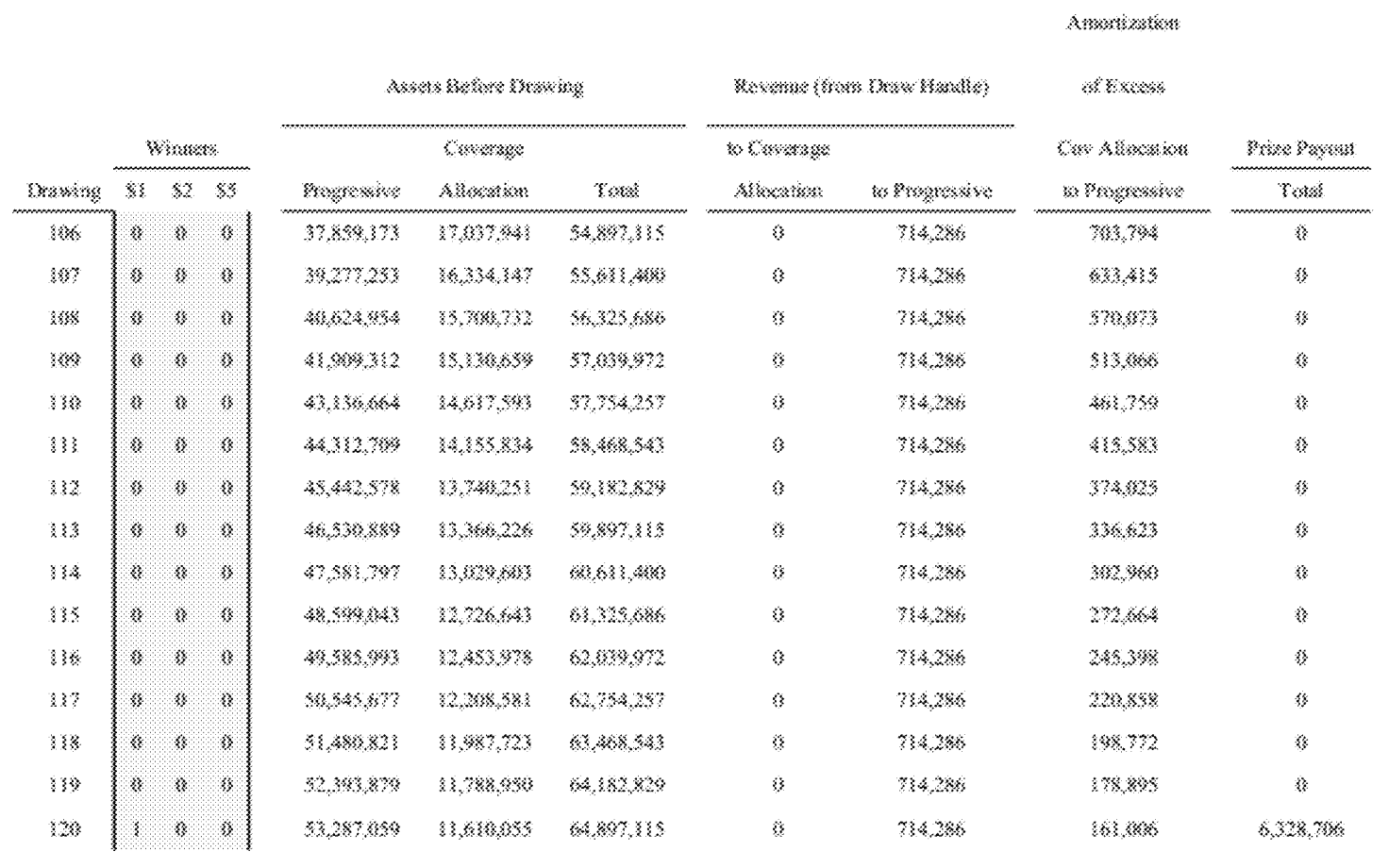
Figure 3K:
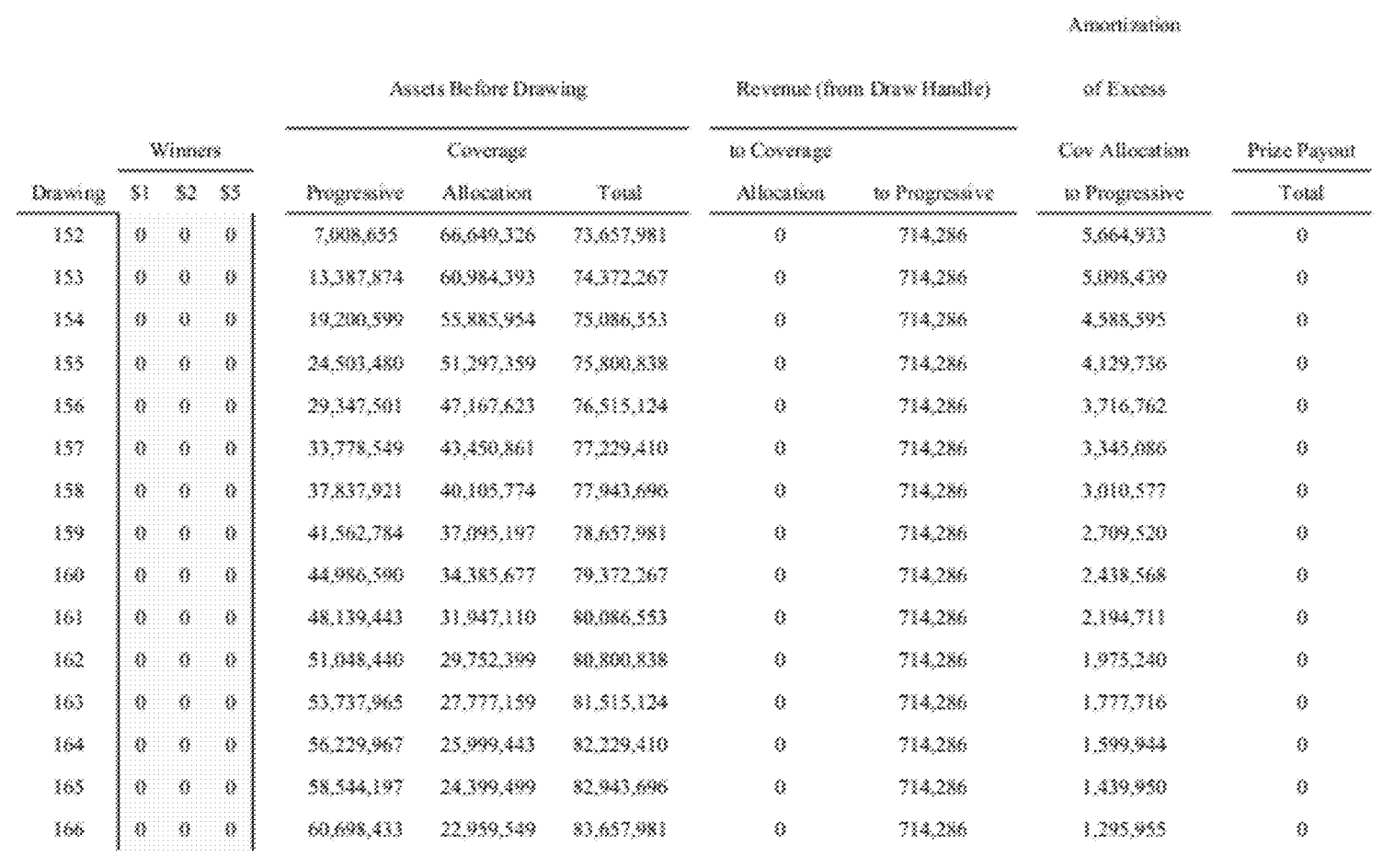

FIGS. 3A though 3L illustrates a plurality of drawings in which the progressive prize is accelerated. The progressive prize is reset if a player wins a drawing irrespective of the price point at which the player purchases a lottery entry.

Further, the jackpot prize management fund is utilized to both provide coverage allocation and accelerate growth of the progressive prize.

Figure 4:
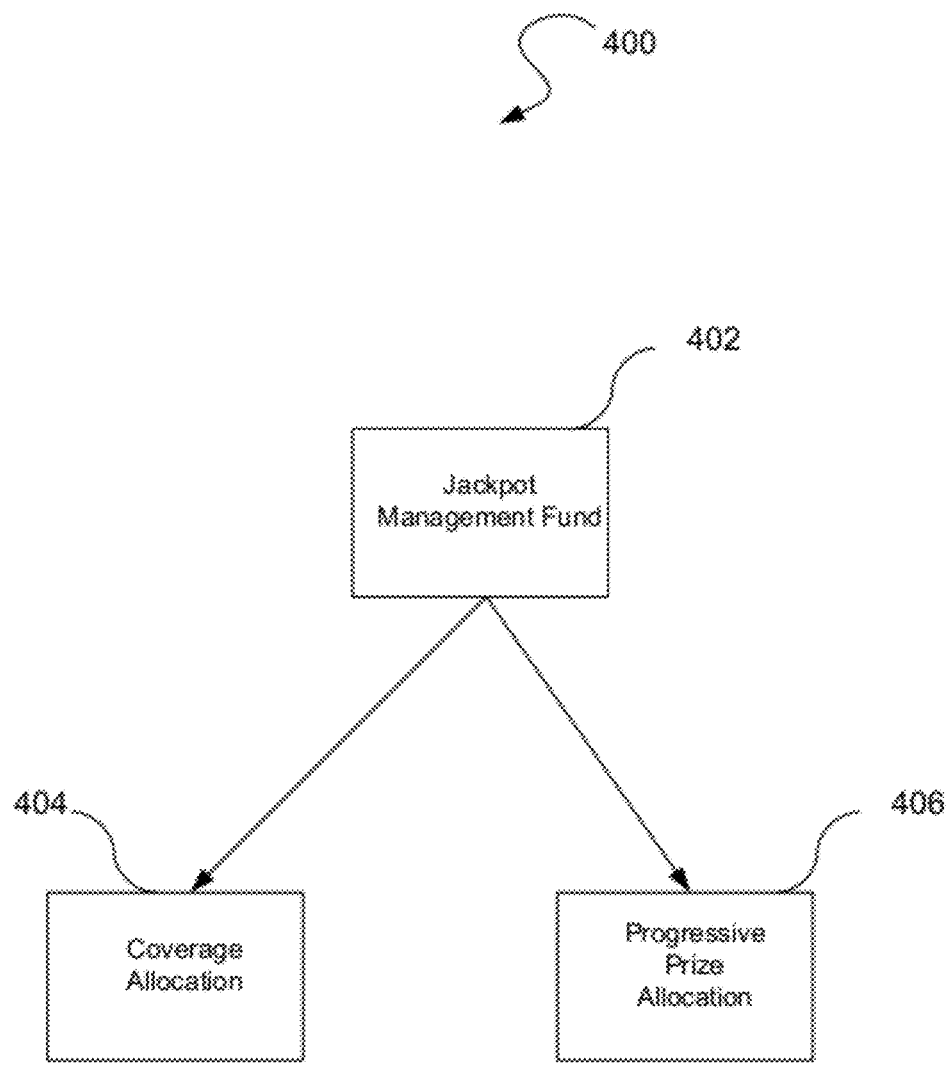
FIG. 4 illustrates a jackpot management system.

FIG. 4 illustrates a jackpot management system 400. The jackpot management system 400 includes a jackpot management fund 402 that provides a flexible solution for a lottery entity. The lottery entity may utilize funds from the jackpot management fund 402 to fund a coverage allocation 404 and a progressive prize allocation 406. In other words, the lottery entity may utilize funds from the jackpot management fund 402 to provide coverage for fixed prizes and/or pari-mutuel prizes in addition to accelerating the progressive prize. During a given draw, if there is not winner, the funds may be provided to the coverage allocation 404 and/or the progressive prize allocation 406. Further, if a player purchases a lottery entry from a price point that is less than the maximum price point, the remaining funds left over from the progressive may be placed into the jackpot management fund for roll over into the coverage allocation 404 and/or the progressive prize allocation 406. In one embodiment, some of the funds in the jackpot management funds may be rolled down to secondary prizes. An example of a secondary prize is a prize for which a lesser match leads to a win than a jackpot prize. As an example, a jackpot prize may involve a full match or a significant amount matched of numbers whereas a secondary prize may involve a lesser amount of numbers having to be matched.

Figure 5:
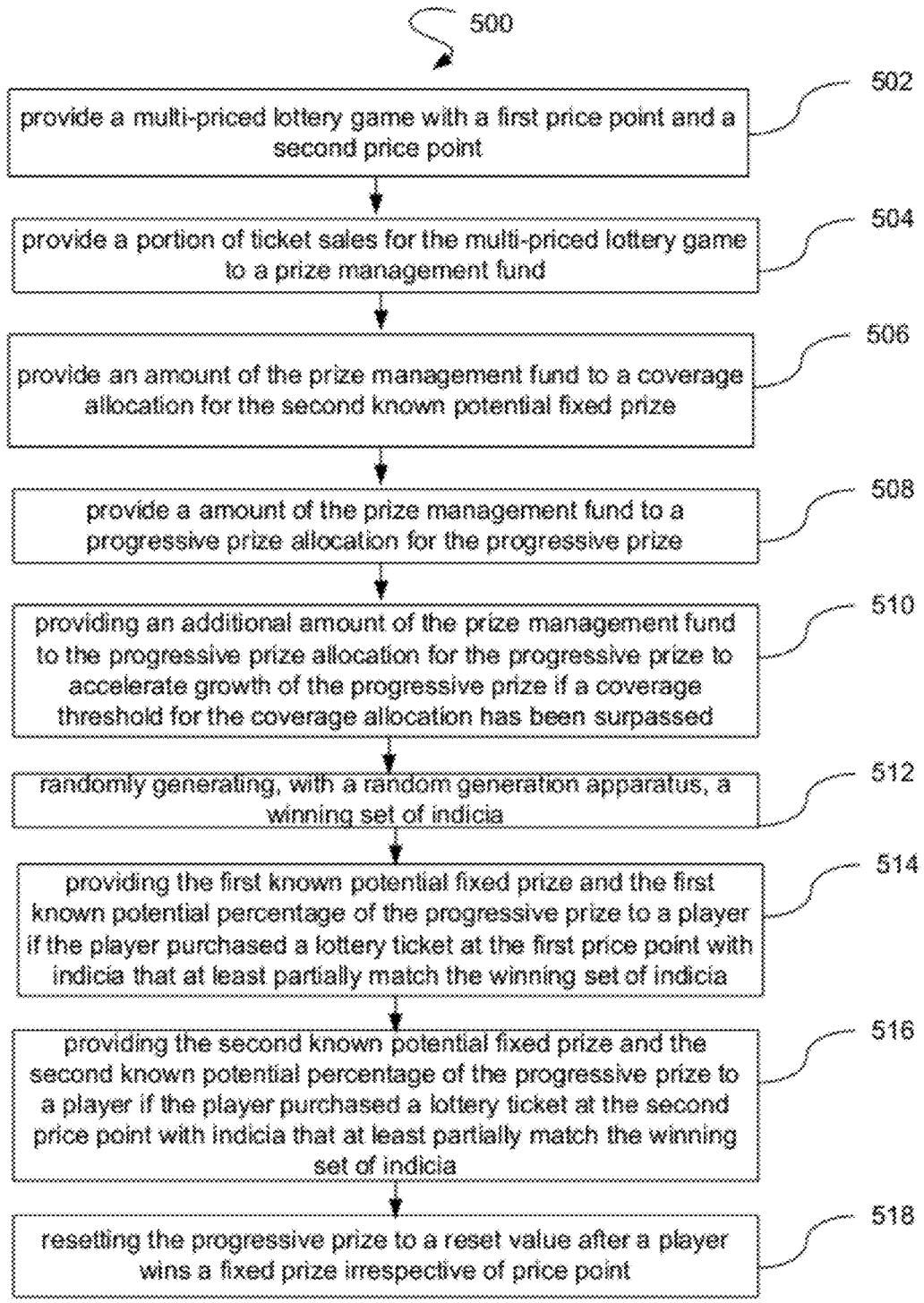
FIG. 5 illustrates a process that may be utilized to provide acceleration and resetting of the progressive prize when utilized in conjunction with fixed prizes.

FIG. 5 illustrates a process 500 that may be utilized to provide acceleration and resetting of the progressive prize when utilized in conjunction with fixed prizes. At a process block 502, the process 500 provides a multi-priced lottery game with a first price point and a second price point such that (i) the first price point corresponds to a first known potential fixed prize and a first known potential percentage of a progressive prize and (ii) the second price point corresponds to a second known potential fixed prize and a second known potential percentage of the progressive prize. The second price point is greater than the first price point. The second known potential fixed prize is greater than the first known potential fixed prize. The second known potential percentage of the progressive prize is greater than the first known potential percentage of the progressive prize. Further, at a process block 504, the process 500 provides a portion of ticket sales for the multi-priced lottery game to a prize management fund. In addition, at a process block 506, the process 500 provides an amount of the prize management fund to a coverage allocation for the second known potential fixed prize. At a process block 508, the process 500 also provides an amount of the prize management fund to a progressive prize allocation for the progressive prize. Further, at a process block 510, the process 500 provides an additional amount of the prize management fund to the progressive prize allocation for the progressive prize to accelerate growth of the progressive prize if a coverage threshold for the coverage allocation has been surpassed. In addition, at a process block 512, the process 500 randomly generates, with a random generation apparatus, a winning set of indicia. At a process block 514, the process 500 also provides the first known potential fixed prize and the first known potential percentage of the progressive prize to a player if the player purchased a lottery ticket at the first price point with indicia that at least partially match the winning set of indicia. Further, at a process block 516, the process 500 provides the second known potential fixed prize and the second known potential percentage of the progressive prize to a player if the player purchased a lottery ticket at the second price point with indicia that at least partially match the winning set of indicia. In addition, at a process block 518, the process 500 resets the progressive prize to a predetermined reset value after a player wins a fixed prize irrespective of price point.

Figure 6:
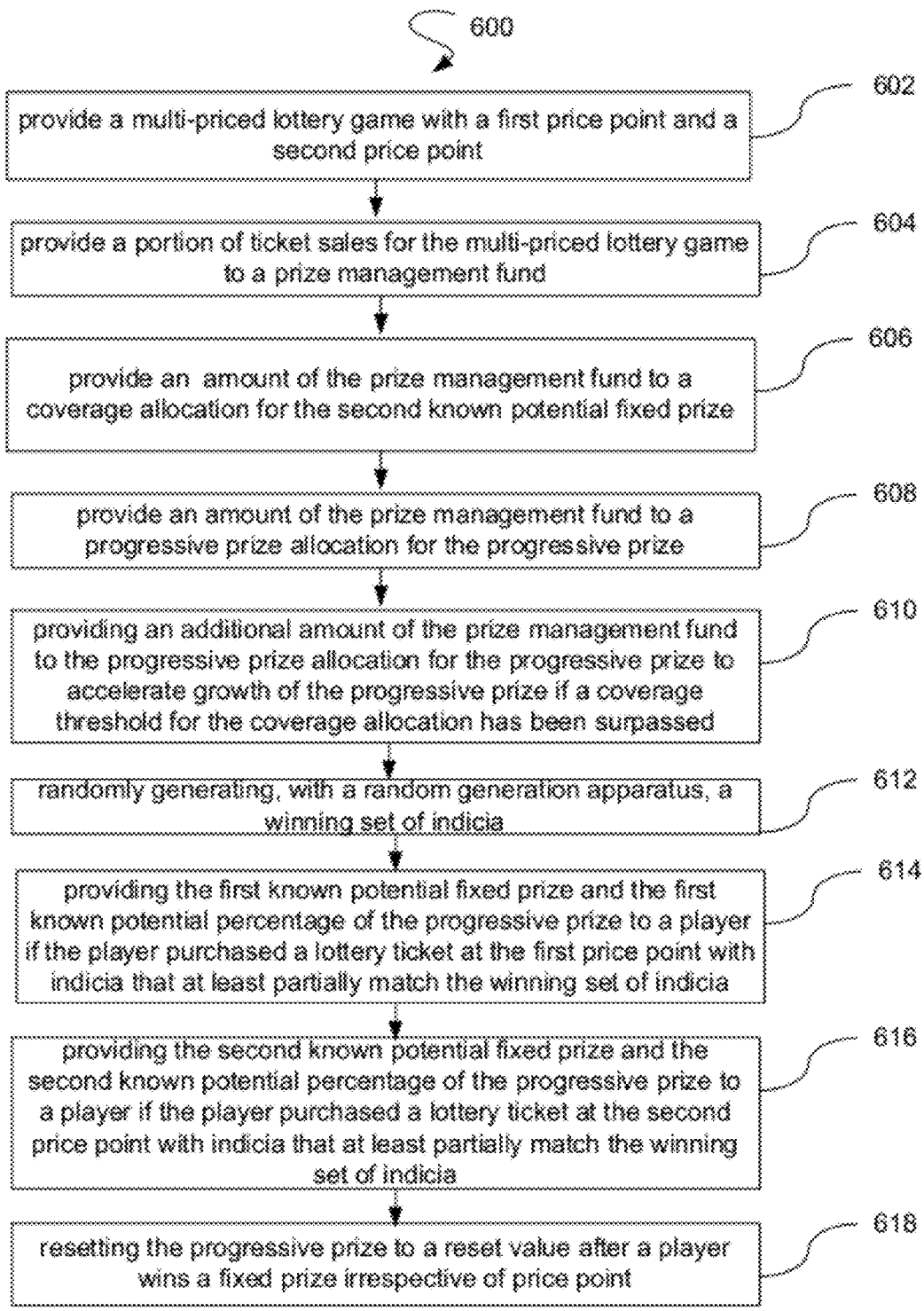
FIG. 6 illustrates a process that may be utilized to provide acceleration and resetting of the progressive prize when utilized in conjunction with pari-mutuel prizes.

FIG. 6 illustrates a process 600 that may be utilized to provide acceleration and resetting of the progressive prize when utilized in conjunction with pari-mutuel prizes. At a process block 602, the process 600 provides a multi-priced lottery game with a first price point and a second price point such that (i) the first price point corresponds to a first pari-mutuel prize and a first known potential percentage of a progressive prize and (ii) the second price point corresponds to a second pari-mutuel prize and a second known potential percentage of the progressive prize. The second price point is greater than the first price point. The second pari-mutuel prize is greater than the first pari-mutuel prize, the second known potential percentage of the progressive prize being greater than the first known potential percentage of the progressive prize. Further, at a process block 604, the process 600 provides a portion of ticket sales for the multi-priced lottery game to a prize management fund. In addition, at a process bock 606, the process 600 provides an amount of the prize management fund to a coverage allocation for the second pari-mutuel prize. At a process block 608, the process 600 also provides an amount of the prize management fund to a progressive prize allocation for the progressive prize. Further, at a process block 610, the process 600 provides an additional amount of the prize management fund to the progressive prize allocation for the progressive prize to accelerate growth of the progressive prize if a coverage threshold for the coverage allocation has been surpassed. At a process block 612, the process 600 also randomly generates, with a random generation apparatus, a winning set of indicia. Further, at a process block 614, the process 600 provides the first pari-mutuel prize and the first known potential percentage of the progressive prize to a player if the player purchased a lottery ticket at the first price point with indicia that at least partially match the winning set of indicia. In addition, at a process block 616, the process 600 provides the second pari-mutuel prize and the second known potential percentage of the progressive prize to a player if the player purchased a lottery ticket at the second price point with indicia that at least partially match the winning set of indicia. At a process block 618, the process 600 also resets the progressive prize to a predetermined reset value after a player wins a pari-mutuel prize irrespective of price point.

In one embodiment, the game of chance is utilized for both non-cash and cash prizes. In other words, different types of winning outcomes provides non-cash and/or cash prizes.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network.

A computer is herein intended to include any device that has a general, multi-purpose or single purpose processor as described above. For example, a computer may be a lottery terminal, a kiosk, a vending machine, a set top box ("STB"), cell phone, portable media player, or the like.

Figure 7:
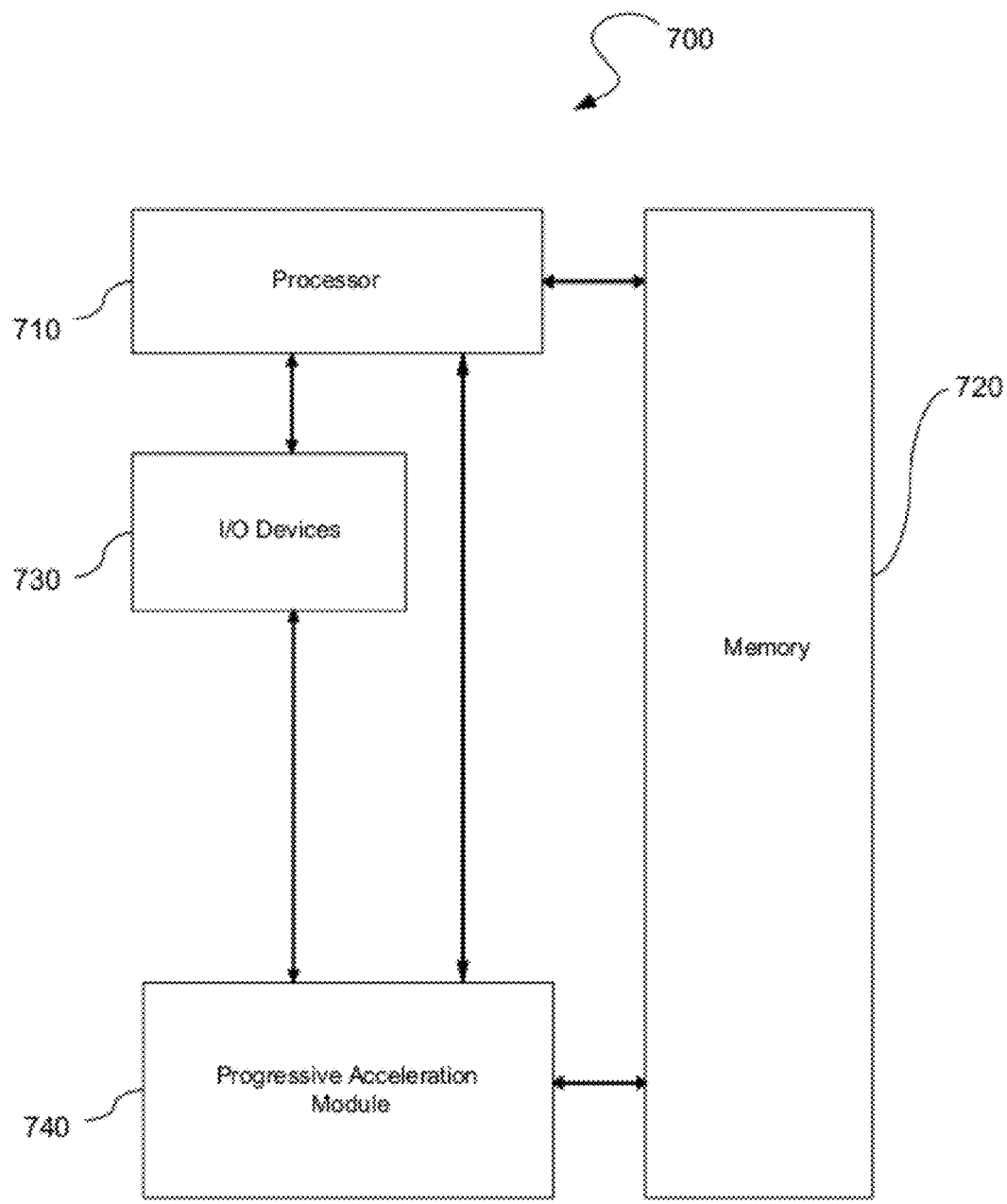
FIG. 7 illustrates a block diagram of a station or system that provides progressive prize acceleration.

FIG. 7 illustrates a block diagram of a station or system 700 that provides progressive prize acceleration. In one embodiment, the station or system 700 is implemented utilizing a general purpose computer or any other hardware equivalents. Thus, the station or system 700 comprises a processor 710, a memory 720, e.g., random access memory ("RAM") and/or read only memory (ROM), a progressive prize acceleration module 740, and various input/output devices 730, (e.g., audio/video outputs and audio/video inputs, storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands)).

It should be understood that the progressive prize acceleration module 740 may be implemented as one or more physical devices that are coupled to the processor 710. For example, the progressive prize acceleration module 740 may include a plurality of modules. Alternatively, the progressive prize acceleration module 740 may be represented by one or more software applications (or even a combination of software and hardware, e.g., using application specific integrated circuits (ASIC)), where the software is loaded from a storage medium, (e.g., a magnetic or optical drive, diskette, or non-volatile memory) and operated by the processor in the memory 720 of the computer. As such, the progressive prize acceleration module 740 (including associated data structures) of the present disclosure may be stored on a computer readable medium, e.g., RAM memory, magnetic or optical drive or diskette and the like.

The station or system 700 may be utilized to implement any of the configurations herein. For example, the processor 710 may be utilized to establish a game, operate a game, perform calculations, or the like.

A virtual device may be utilized to provide any of the games provided herein. For example, a virtual lottery ticket may be sold rather than a paper ticket. For instance, a player may be able to purchase an electronic version of a ticket through a computing device such as a computer, laptop, kiosk, cell phone, smart phone, personal digital assistant, or the like.

A supplemental game may be utilized in addition to any of the configurations provided herein. Further, any of the configurations provided may be utilized as a supplemental game.

A variety of price points may be utilized. Although two price points are illustrated, any of the configurations described herein may include more price points.

It is understood that the processes and systems described herein may also be applied in other types of processes and systems. Those skilled in the art will appreciate that the various adaptations and modifications of the embodiments of the processes and systems described herein may be configured without departing from the scope and spirit of the present processes and systems. Therefore, it is to be understood that, within the scope of the appended claims, the present processes and systems may be practiced other than as specifically described herein.

We claim:

1. A method comprising:

providing, with a processor, a multi-priced lottery game with a first price point and a second price point such that (i) the first price point corresponds to a first known potential constant fixed prize and a first known potential percentage of a progressive prize and (ii) the second price point corresponds to a second known potential constant fixed prize and a second known potential percentage of the progressive prize, the second price point being greater than the first price point, the second known potential constant fixed prize being greater than the first known potential constant fixed prize, the second known potential percentage of the progressive prize being greater than the first known potential percentage of the progressive prize;

providing a portion of ticket sales for the multi-priced lottery game to a prize management fund;

providing, with the processor, an amount of the prize management fund to a coverage allocation for the second known potential constant fixed prize, the coverage allocation providing funding coverage for the second known potential constant fixed prize;

providing, with the processor, an amount of the prize management fund to a progressive prize allocation for the progressive prize, the progressive prize allocation providing funding coverage for the progressive prize, the progressive prize allocation being distinct from the coverage allocation;

providing, with the processor, an additional amount of the prize management fund to the progressive prize allocation for the progressive prize to accelerate growth of the progressive prize if a coverage threshold for the coverage allocation for the second known potential constant fixed prize has been surpassed;

randomly generating, with a random generation apparatus, a winning set of indicia subsequent to determination of the first known potential constant fixed prize and the second known potential constant fixed prize;

providing the first known potential constant fixed prize and the first known potential percentage of the progressive prize to a player if the player purchased a lottery ticket at the first price point with indicia that at least partially match the winning set of indicia;

providing the second known potential constant fixed prize and the second known potential percentage of the progressive prize to a player if the player purchased a lottery ticket at the second price point with indicia that at least partially match the winning set of indicia; and resetting, with the processor, the progressive prize to a predetermined reset value after a player wins a constant fixed prize irrespective of price point.

2. The method of claim 1, wherein the second known potential percentage of the progressive prize equals one hundred percent.

3. The method of claim 2, wherein first known potential percentage of the progressive prize equals a percentage that results from the first known fixed prize divided by the second known fixed prize.

4. The method of claim 1, wherein the random generation apparatus is a ball hopper.

5. The method of claim 1, wherein the random generation apparatus is a random number generator.

6. The method of claim 1, wherein the indicia are numbers.

7. The method of claim 1, wherein the indicia are symbols.

8. The method of claim 1, wherein the predetermined reset value equals zero.

9. The method of claim 1, wherein the coverage allocation is also utilized for the first known potential constant fixed prize.

10. The method of claim 1, further comprising providing an additional amount of the prize management fund for roll down to at least one secondary prize.

11. The method of claim 1, wherein the coverage threshold is the second known potential constant fixed prize.

12. A method comprising:
providing, with a processor, a multi-priced lottery game with a first price point and a second price point such that (i) the first price point corresponds to a first pari-mutuel prize and a first known potential percentage of a progressive prize and (ii) the second price point corresponds to a second pari-mutuel prize and a second known potential percentage of the progressive prize, the second price point being greater than the first price point, the second pari-mutuel prize being greater than the first pari-mutuel prize, the second known potential percentage of the progressive prize being greater than the first known potential percentage of the progressive prize;
providing a portion of ticket sales for the multi-priced lottery game to a prize management fund;
providing, with the processor, an amount of the prize management fund to a coverage allocation for the second pari-mutuel prize, the coverage allocation providing funding coverage for the second pari-mutuel prize;
providing, with the processor, an amount of the prize management fund to a progressive prize allocation for the progressive prize, the progressive prize allocation providing funding coverage for the progressive prize, the progressive prize allocation being distinct from the coverage allocation;
providing, with the processor, an additional amount of the prize management fund to the progressive prize allocation for the progressive prize to accelerate growth of the progressive prize if a coverage threshold for the coverage allocation for the second pari-mutuel prize has been surpassed;
randomly generating, with a random generation apparatus, a winning set of indicia;
providing the first pari-mutuel prize and the first known potential percentage of the progressive prize to a player if the player purchased a lottery ticket at the first price point with indicia that at least partially match the winning set of indicia;
providing the second pari-mutuel prize and the second known potential percentage of the progressive prize to a player if the player purchased a lottery ticket at the second price point with indicia that at least partially match the winning set of indicia; and
resetting, with the processor, the progressive prize to a predetermined reset value after a player wins a pari-mutuel prize irrespective of price point.

13. The method of claim 12, wherein the second known potential percentage of the progressive prize equals one hundred percent.

14. The method of claim 13, wherein first known potential percentage of the progressive prize equals a percentage that results from the first pari-mutuel prize divided by the second pari-mutuel prize.

15. The method of claim 12, wherein the random generation apparatus is a ball hopper.

16. The method of claim 12, wherein the random generation apparatus is a random number generator.

17. The method of claim 12, wherein the indicia are numbers.

18. The method of claim 12, wherein the indicia are symbols.

19. The method of claim 12, wherein the predetermined reset value equals zero.

20. The method of claim 12, wherein the coverage allocation is also utilized for the first pari-mutuel prize.

21. The method of claim 12, further comprising providing an additional amount of the prize management fund for roll down to at least one secondary prize.

22. The method of claim 12, wherein the coverage threshold is a second pari-mutuel prize.

23. A computer program product comprising a computer useable storage device having a computer readable program, wherein the computer readable program when executed on a computer causes the computer to:
provide a multi-priced lottery game with a first price point and a second price point such that (i) the first price point corresponds to a first known potential fixed prize and a first known potential percentage of a progressive prize and (ii) the second price point corresponds to a second known potential fixed prize and a second known potential percentage of the progressive prize, the second price point being greater than the first price point, the second known potential fixed prize being greater than the first known potential fixed prize, the second known potential percentage of the progressive prize being greater than the first known potential percentage of the progressive prize;
provide a portion of ticket sales for the multi-priced lottery game to a prize management fund;
provide an amount of the prize management fund to a coverage allocation for the second known potential fixed prize, the coverage allocation providing funding coverage for the second known potential fixed prize;
provide an amount of the prize management fund to a progressive prize allocation for the progressive prize, the progressive prize allocation providing funding coverage for the progressive prize, the progressive prize allocation being distinct from the coverage allocation;
provide an additional amount of the prize management fund to the progressive prize allocation for the progressive prize to accelerate growth of the progressive prize if a coverage threshold for the coverage allocation for the second known potential constant fixed prize has been surpassed;
randomly generate, with a random generation apparatus, a winning set of indicia subsequent to determination of the first known potential constant fixed prize and the second known potential constant fixed prize;
provide the first known potential fixed prize and the first known potential percentage of the progressive prize to a player if the player purchased a lottery ticket at the first price point with indicia that at least partially match the winning set of indicia;
provide the second known potential fixed prize and the second known potential percentage of the progressive prize to a player if the player purchased a lottery ticket at the second price point with indicia that at least partially match the winning set of indicia; and
reset the progressive prize to a predetermined reset value after a player wins a fixed prize irrespective of price point.

24. A computer program product comprising a computer useable storage device having a computer readable program, wherein the computer readable program when executed on a computer causes the computer to:
provide a multi-priced lottery game with a first price point and a second price point such that (i) the first price point corresponds to a first pari-mutuel prize and a first known potential percentage of a progressive prize and (ii) the second price point corresponds to a second pari-mutuel prize and a second known potential percentage of the progressive prize, the second price point being greater than the first price point, the second pari-mutuel prize being greater than the first pari-mutuel prize, the second known potential percentage of the progressive prize being greater than the first known potential percentage of the progressive prize;

provide a portion of ticket sales for the multi-priced lottery game to a prize management fund;

provide an amount of the prize management fund to a coverage allocation for the second pari-mutuel prize, the coverage allocation providing funding coverage for the second pari-mutuel prize;

provide an amount of the prize management fund to a progressive prize allocation for the progressive prize, the progressive prize allocation providing funding coverage for the progressive prize, the progressive prize allocation being distinct from the coverage allocation;

provide an additional amount of the prize management fund to the progressive prize allocation for the progressive prize to accelerate growth of the progressive prize if a coverage threshold for the coverage allocation for the second pari-mutuel prize has been surpassed;

randomly generate, with a random generation apparatus, a winning set of indicia;

provide the first pari-mutuel prize and the first known potential percentage of the progressive prize to a player if the player purchased a lottery ticket at the first price point with indicia that at least partially match the winning set of indicia;

provide the second pari-mutuel prize and the second known potential percentage of the progressive prize to a player if the player purchased a lottery ticket at the second price point with indicia that at least partially match the winning set of indicia; and reset the progressive prize to a predetermined reset value after a player wins a pari-mutuel prize irrespective of price point.

25. A system comprising:

an establishment module that establishes a multi-priced lottery game with a first price point and a second price point such that (i) the first price point corresponds to a first known potential fixed prize and a first known potential percentage of a progressive prize and (ii) the second price point corresponds to a second known potential fixed prize and a second known potential percentage of the progressive prize, the second price point being greater than the first price point, the second known potential fixed prize being greater than the first known potential fixed prize, the second known potential percentage of the progressive prize being greater than the first known potential percentage of the progressive prize;

an allocation module, which is operated by a processor, that (i) provides a portion of ticket sales for the multi-priced lottery game to a prize management fund, (ii) provides an amount of the prize management fund to a coverage allocation for the second known potential fixed prize, (iii) provides an amount of the prize management fund to a progressive prize allocation for the progressive prize, and (iv) provides an additional amount of the prize management fund to the progressive prize allocation for the progressive prize to accelerate growth of the progressive prize if a coverage threshold for the coverage allocation for the second known potential constant fixed prize has been surpassed, the coverage allocation providing funding coverage for the second known potential constant fixed prize, the progressive prize allocation providing funding coverage for the progressive prize, the progressive prize allocation being distinct from the coverage allocation;

a random generation apparatus that randomly generates a winning set of indicia;

a first distribution module that provides the first known potential fixed prize and the first known potential percentage of the progressive prize to a player if the player purchased a lottery ticket at the first price point with indicia that at least partially match the winning set of indicia;

a second distribution module that provides the second known potential fixed prize and the second known potential percentage of the progressive prize to a player if the player purchased a lottery ticket at the second price point with indicia that at least partially match the winning set of indicia; and a reset module that resets the progressive prize to a predetermined reset value after a player wins a fixed prize irrespective of price point.

26. A system comprising:

an establishment module that establishes a multi-priced lottery game with a first price point and a second price point such that (i) the first price point corresponds to a first pari-mutuel prize and a first known potential percentage of a progressive prize and (ii) the second price point corresponds to a second pari-mutuel prize and a second known potential percentage of the progressive prize, the second price point being greater than the first price point, the second pari-mutuel prize being greater than the first pari-mutuel prize, the second known potential percentage of the progressive prize being greater than the first known potential percentage of the progressive prize;

an allocation module, which is operated by a processor, that (i) provides a portion of ticket sales for the multi-priced lottery game to a prize management fund, (ii) provides an amount of the prize management fund to a coverage allocation for the second pari-mutuel prize, and (iii) provides an amount of the prize management fund to a progressive prize allocation for the progressive prize, and (iv) provides an additional amount of the prize management fund to the progressive prize allocation for the progressive prize to accelerate growth of the progressive prize if a coverage threshold for the coverage allocation for the second pari-mutuel prize has been surpassed, the coverage allocation providing funding coverage for the second pari-mutuel prize, the progressive prize allocation providing funding coverage for the progressive prize, the progressive prize allocation being distinct from the coverage allocation;

a random generation apparatus that randomly generates a winning set of indicia;

a first distribution module that provides the first pari-mutuel prize and the first known potential percentage of the progressive prize to a player if the player purchased a lottery ticket at the first price point with indicia that at least partially match the winning set of indicia;

a second distribution module that provides the second pari-mutuel prize and the second known potential percentage of the progressive prize to a player if the player purchased a lottery ticket at the second price point with indicia that at least partially match the winning set of indicia; and a reset module that resets the progressive prize to a predetermined reset value after a player wins a pari-mutuel prize irrespective of price point.

* * * * *